Jan. 21, 1930.　　W. LAJEUNESSE　　1,744,170
QUACK GRASS REMOVER
Filed March 26, 1927　　4 Sheets-Sheet 1

Inventor
W. Lajeunesse
by Hubert Peck
atty

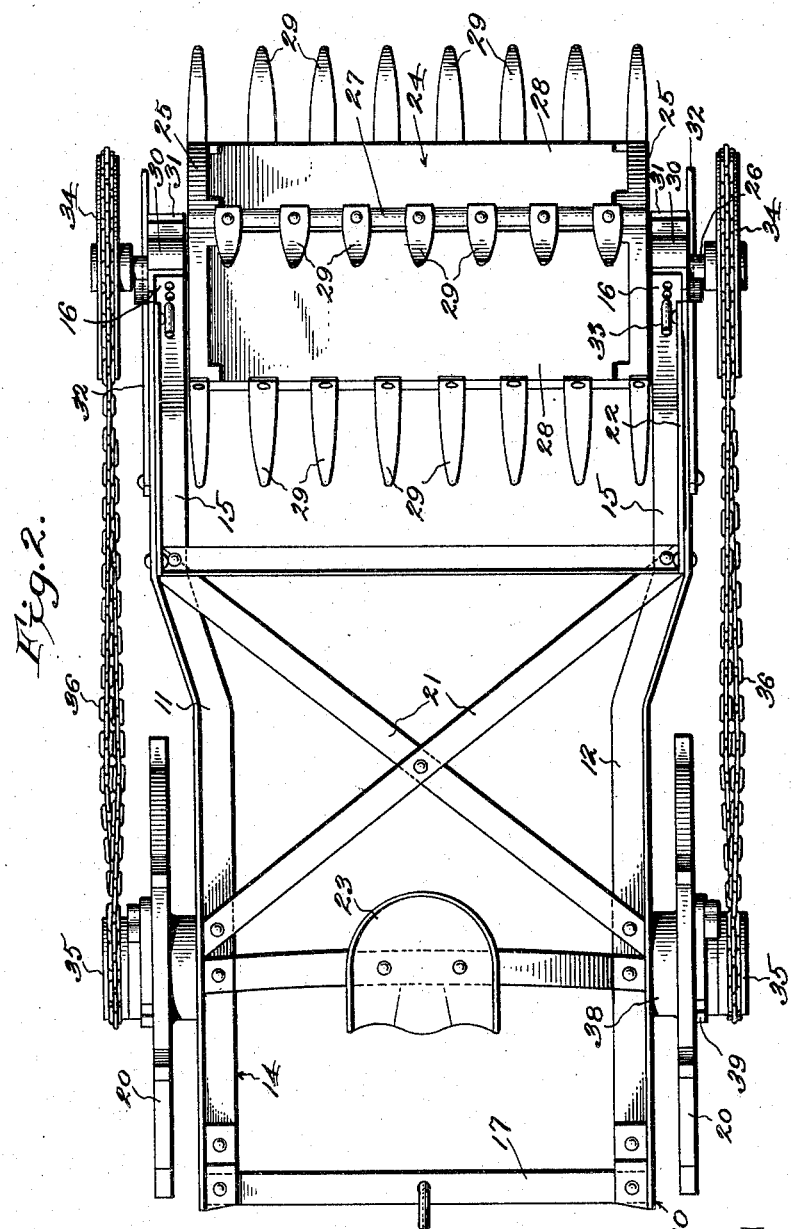

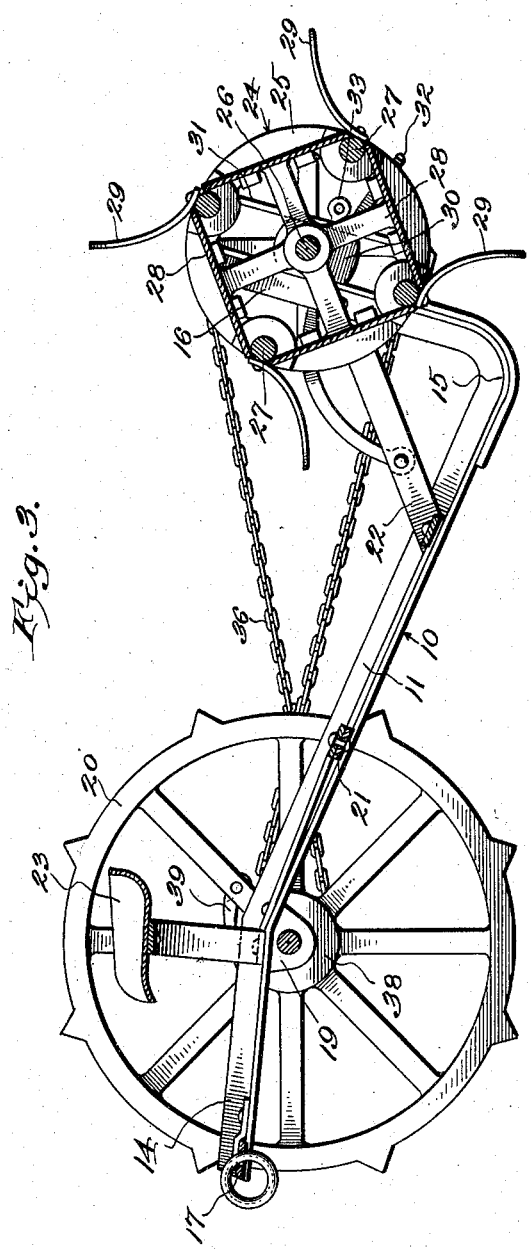

Jan. 21, 1930.  W. LAJEUNESSE  1,744,170
QUACK GRASS REMOVER
Filed March 26, 1927   4 Sheets-Sheet 4
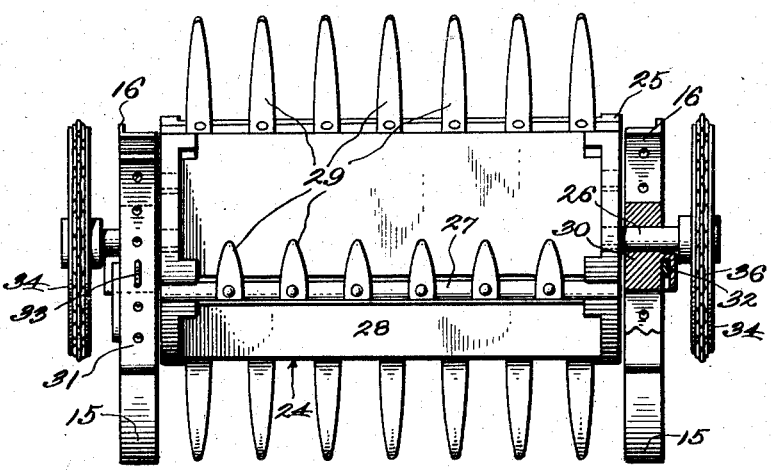
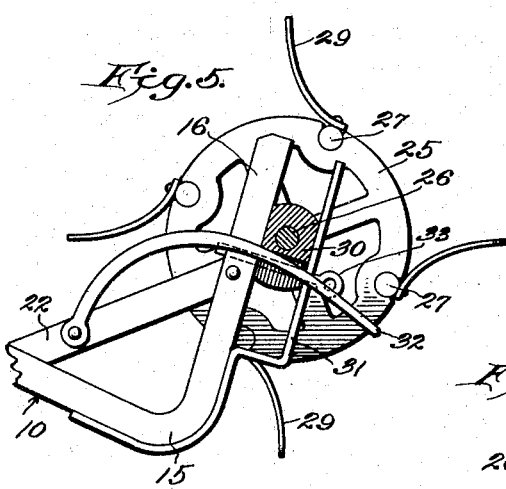
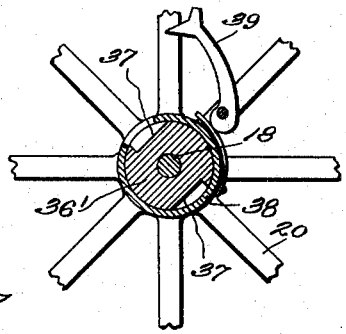
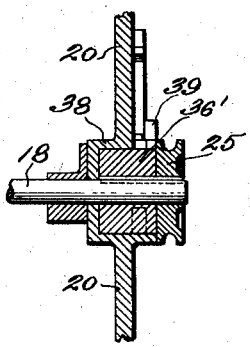
Inventor
W. Lajeunesse
by Hubert E Peck atty Patented Jan. 21, 1930

1,744,170

UNITED STATES PATENT OFFICE

WILFRED LAJEUNESSE, OF GLADSTONE, MICHIGAN

QUACK-GRASS REMOVER

Application filed March 26, 1927. Serial No. 178,623.

This invention relates to certain improvements in quack grass removers; and the nature and objects of the invention will be readily recognized and understood by those skilled in the art in the light of the following explanation and detailed description of the accompanying drawings illustrating what I at present consider to be the preferred embodiments or mechanical expressions of my invention from among various other forms, arrangements, combinations, and constructions of which the invention is capable within the spirit and the scope thereof.

With quack and the like grass or vegetation having extensive roots and of rapid growth, great difficulty is experienced in removing and destroying such grass or vegetation from the ground. If the majority of the roots are not removed and exposed above the surface of the ground, continued growth thereof takes place with the result that within a short period of time the ground is unfit for growing other plants therein and the relief is but temporary. Such characters of grass or vegetation forms beneath the surface of the ground what is in effect a mat of closely entangled and crossing roots in which it is practically impossible for any other plants to grow as they are quickly strangled and killed by these roots. The problem is a serious one in preparing ground for planting because such grass and vegetation must be first removed from the soil and destroyed.

The present invention is directed to the solution of the several problems encountered in the removal and destruction of quack and the like grass, through the provision of apparatus by which the grass and the roots thereof can be removed from the soil and deposited for exposure and destruction on the surface of the ground, the roots being removed and severed from the ground.

A further object of the invention is to provide apparatus for removing and destroying quack and the like grass or vegetation, in which spring teeth or the like are employed to enter the ground and remove the roots therefrom, and then deposit these severed and removed roots on the surface of the ground, and in which the extent of ground entry by the teeth is adjustable to meet the particular conditions of the ground being operated upon.

Another object of the invention is to provide apparatus for removing quack and the like grass from the ground, in which a rotating member is formed with longitudinal rows of spring or the like teeth for entry into the ground to engage and remove the grass roots and deposit them on the surface, and further in which the space between the rotary member and the ground is adjustable, but by which a space is maintained between the member and the ground for passage of soil, rocks, and the like therebetween.

Another object of the invention resides in the provision of a design and construction of quack grass and the like removing apparatus, of simple but efficient mechanical design, of relatively light weight to require a minimum of operating power and yet of strong and durable character to withstand the strains and stresses encountered in use and operation.

With the foregoing general objects, and certain other aims and objects in view which will be readily apparent from the following description, the invention consists in certain novel features in construction and in combinations and arrangements of elements, as will be more fully and particularly referred to and specified hereinafter.

Referring to the accompanying drawings, in which similar reference characters refer to corresponding parts throughout the several figures thereof:

Fig. 2 is a view in top plan of the apparatus of Fig. 1.

Fig. 3 is a longitudinal vertical section through the apparatus of Figs. 1 and 2.

Fig. 4 is a view in rear elevation.

Fig. 5 is a detailed view of the adjustable mounting of the drum on the rear vertical supports.

Figs. 6 and 7 are detailed sectional views of the wheel clutch mechanisms.

Figure 1:
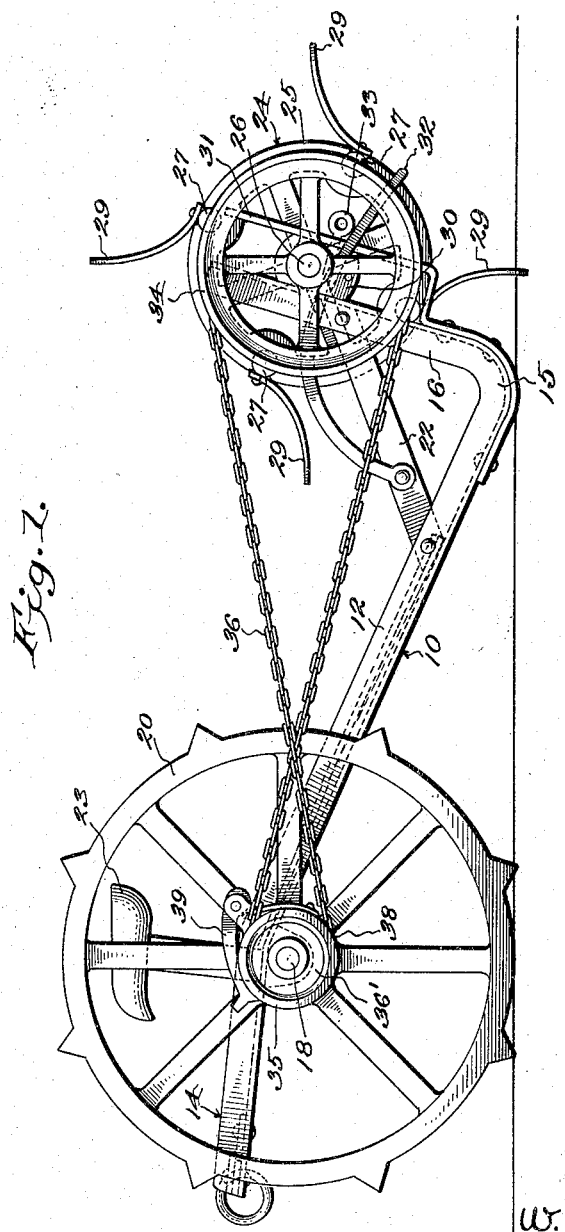
Fig. 1 is a view in side elevation of quack grass removing apparatus of the invention.

A possible form and embodiment of invention is disclosed in the accompanying drawings and described herewith, purely by way of example and not of limitation, to enable those skilled in the art to understand the principles and various features of the invention, and while the illustrated embodiment is particularly designed and intended for use in the removal and destruction of quack grass, the invention is in no sense limited to such use, as obviously it is of general adaptation for embodiment in apparatus for removing and destroying all types, species and characters of subsoil vegetation and roots.

According to the invention, quack grass removing apparatus embodies and includes a main frame 10, consisting of the side bars or beams 11 and 12, preferably, although not necessarily formed of angle or channel irons, and disposed in parallel relation inclined rearwardly and downwardly and then upwardly and rearwardly to provide the frame 10 with the elevated forward portion or platform 14, and the rear end spaced, ground engaging skids 15 having the upwardly and rearwardly extending standards or supports 16. A transverse beam or member 17 is extended across and between the forward ends of the frame side beams 11 and 12 at the front elevated platform 14. An axle 18 is mounted for rotation in the journals or bearings 19 depending from the frame side beams 11 and 12 at the rear end of the front elevated platform 14, across and between the side bars and extended outwardly and beyond to receive the main supporting and driving wheels 20 of the apparatus. Intermediate the forward platform 14 and the rear supporting skids 15 is disposed any suitable arrangement of cross bracing 21 between the frame side beams to rigidly secure the same in a desired spaced frame forming relation. To strengthen and brace the rear vertical columns or supports 16, cross braces 22 are extended between these supports and the side beams of the frame, over and above the rear end skids 15, as will be clear by reference to Fig. 1 of the accompanying drawings.

The frame 10 is thus supported at its forward end by and on the wheels 20, and at its rear end on and by the skids 15 which slidably bear upon the surface of the ground, with the front elevated platform 14 of the frame disposed in substantially horizontally position. Any suitable means (not shown) can be provided on and carried by the cross bar 17 or on and from the platform 14 for coupling the frame to a source of power. A driver's or operator's seat 23 is mounted and supported in a suitable manner on and from the side beams 11 and 12 of the frame, adjacent the rear end of the platform 14. By coupling the wheel frame 10 to a suitable source of motive power such as a team of horses or a tractor, the frame can be drawn forwardly on the wheels 20 with the rear of the frame supported on and slidable over the surface of the ground by the rear skids 15.

At the rear of the frame and rotatably supported on and extending between the rear supports or standards 17, is a drum 24. This drum consists of the opposite end plates 25, in the present instance, circular in form, mounted upon a shaft 26. At spaced intervals around the end plates 25, cross rods or members 27 are secured extended between and across these plates to form therewith a drum frame work on the shaft 26. The space between the rods 27 is enclosed and covered by plates 28. On and at spaced intervals along each rod 27 are secured the spring teeth 29 extended outwardly therefrom and curved outwardly from the adjacent drum closing plate 28. It will here be noted that the teeth carried by each rod are disposed thereon in staggered relation with respect to the teeth carried upon the next adjacent rods, so that, the teeth of each rod lie disposed in a plane between the teeth of the next adjacent rods, for purpose which will be referred to and explained more in detail hereinafter.

The spring tooth carrying drum formed and constructed as above described is rotatably mounted by means of the extended ends of the shaft or axle 26, in journal boxes or bearings 30 which are mounted for movement longitudinally of the supports 16 for vertical adjustment therein to permit of vertical adjustment of the toothed drums. In the particular example hereof, journal guide members 31 are secured to and extend parallel with and spaced rearwardly from the vertical drum supports 16, and the journal boxes 30 are mounted and confined between the drum supports 16 and these guide members for vertical movement therein. Curved arms 32 extend upwardly and rearwardly from the opposite side braces 22, to which they are pivotally connected to and extend slidably through and confined in the journal boxes or bearings 30. The guide members 31 and vertical drum supports 16 are formed with series of alined bores or openings to receive the pins 33, provided and extended through these bores or openings, and through the journal boxes to maintain these boxes with the shaft and the drum in the desired vertically adjusted position spaced from the ground. By the arrangement, the height of the drum and hence of the teeth 29 from the ground, can be adjusted.

The toothed drum 24 is rotated forwardly toward the front end of the frame by means of a suitable drive mechanism from the main front wheels 20 of the apparatus. Pulleys or gears 34 are fixed to the opposite outer ends of the drum shaft 26, and similar pulleys or gears 35, but in the present example of smaller diameter, are fixed to the opposite outer ends of the axle 18. The axle carried pulleys 35 are connected with the respective drum shaft carried pulleys 34 with which they are alined, by means of the chains, belts or the like 36. The relative sizes of the axle carried gears 33 and the drum carried gears 34 can be such as to secure the desired speed or rate of rotation of the drum 24. The main driving wheels 20 are provided with suitable clutch mechanisms by which they can be completely disengaged from the axle 18 for independent rotation thereon, or can be operatively coupled with this axle for rotating the same with the apparatus moving forwardly, while permitting independent rotation of the wheels when the apparatus is moved in the rearward or reversed direction. These clutch mechanisms are similar in construction and arrangement and each embodies a member 36[1] fixed to the axle and are formed with the notches or teeth 37. The hubs 38 of the wheels 20 are hollow and fit over and receive the tooth members 37 fixed on the axle ends and each hub carries a dog or pawl 39 pivotally mounted thereon and extending through a slot therein for engaging the teeth 37 of the members 36 on the axle 18, when the wheels 20 are rotated by forward movement of the apparatus, so that the axle 18 is rotated. These dogs or pawls 39 can be swung outwardly and retained in inoperative position, out of engagement with the members 36, so that the wheels 20 can be freely rotated independently of the axle 18.

In operation and use of the apparatus as described, the drum 24 is vertically adjusted to the desired height from the ground for the particular conditions under which it is to be operated, and the forward end of the apparatus is connected with any suitable source of power (not shown) for drawing the same forwardly across the ground to be operated upon. With ground in which the quack or the like grass is to be removed, the ground is first plowed up, harrowed or otherwise loosened before operating the apparatus of this invention thereover. After the ground is properly loosened, the apparatus hereof is drawn forwardly thereacross with the wheel clutch mechanisms in position engaging axle 18 on forward movement of the apparatus and thereby rotating such axle. It will here be noted that the driving chains or belts 36 are crossed so as to secure reverse rotation of the pulleys 34 by the pulleys 35 which are rotated upon rotation of axle 18. Thus, pulleys 34 are rotated rearwardly with respect to the apparatus and thereby rotate shaft 26 with drum 24 in a direction toward the rear of the apparatus. This rearward rotation of drum 24 moves the spring teeth 29 downwardly and forwardly through the ground beneath or below the drum and then upwardly and rearwardly from the ground, the teeth being curved as hereinbefore explained in the direction of rotation of the drum. The teeth thus enter and pass through the ground a distance thereinto and engage and remove the grass and roots therefrom, elevating such grass and roots upwardly and then rearwardly over the drum and casting or discharging the same on the surface of the ground to the rear of the apparatus as it passes thereover. The skids 15 bearing upon and riding over the ground maintain the drum with its teeth at the desired distance above the ground so as to at all times maintain the required space between the ground and the inner ends of the teeth and the closed drum to permit passage of earth, stones and the like rearwardly between the drum and the teeth. Due to the plates 28 closing the drum between the teeth carrying rods 27, the possibility of entry of dirt into the drum is eliminated.

It will here be noted that due to the flat plates or surfaces extending across the drum between the rows of teeth, as a row of teeth moves downwardly at the rear side of the drum and through the earth, such flat surface lies spaced above and substantially parallel with the surface of the ground to form a passage for rearward movement of earth and the like beneath the drum unobstructed at its upper side. Thus, these flat surfaces between the rows of teeth when disposed above the ground at the lower side of the drum, eliminate any downward forces on the earth passing therebeneath, tending to choke or clog the passage.

The construction of the apparatus of the invention is simple and inexpensive with a minimum possibility of breakage or failure under the various conditions of operation and use, and yet in which positive efficient operation is secured. By the simplicity of the structure and arrangement, a minimum weight is obtained which requires a relatively small power output to draw or drag the apparatus across and over the ground.

It is also evident that various other arrangements, combinations, variations and constructions might be resorted to without departing from the spirit and scope of my invention, and hence I do not wish to limit myself to the exact and specific disclosures hereof.

Desiring to protect my invention in the broadest manner legally possible, what I claim is:

1. In apparatus for removing quack grass, a frame, supporting wheels mounted at the forward end of the frame, the frame inclined rearwardly and downwardly and provided at the rear ends with ground engaging skids, upwardly extending support members from said skids, a drum rotatably mounted and supported on and between said support members above said skids, teeth on said drum for engagement with the ground to engage and remove grass therefrom, and means for rotating said drum.

2. In apparatus for removing quack grass, a frame, wheels mounted at and supporting the forward end of the frame, spaced skids at and supporting the rear end of the frame, upwardly extending support members at the rear end of the frame, a toothed drum rotatably supported on and between said members spaced above the skids, means for vertically adjusting said drum on said members, and means for rotating the drum.

3. In apparatus for removing quack grass, a frame having rear, spaced ground engaging skids supporting the same, upwardly disposed support members on the frame above said skids, a toothed drum rotatably mounted and supported on and between said members transversely of the frame, said drum including a shaft, journal boxes carried by said support members for vertical adjustment, the drum shaft mounted in said journal boxes, means for adjusting and maintaining said drum and shaft in vertically adjusted positions.

4. In apparatus for removing quack grass, a frame, spaced ground engaging skids supporting the rear end of the frame, supporting members extending upwardly from said skids, a journal box mounted on each support member for vertical movement thereon, means for securing said journal boxes in vertically adjusted positions, arm members pivotally mounted to the frame and slidably engaging said journal boxes for swinging movement to raise and lower said boxes to adjusted positions, and a toothed drum rotatably mounted and supported in said journal boxes and extending between said support members above the skid members transversely of the frame.

5. In apparatus for removing quack grass, a frame, supporting wheels at the forward end of the frame, said frame including spaced side members extending rearwardly and downwardly from the forward end of the frame to and terminating in spaced ground engaging and supported skids formed therefrom, and a toothed rotary member mounted on and supported by the frame above said skids for engagement with the ground.

6. In apparatus for removing quack grass, a frame, supporting wheels at the forward end of said frame, said frame including spaced side bars extending rearwardly and downwardly, the rear ends of said bars bent upwardly to form spaced ground engaging skids, the upwardly bent ends of the bars extended vertically from the skids to provide spaced supports, and a toothed rotary member mounted on and extending between said spaced supports above said skids, the toothed rotary member maintained in ground engaging relation by said skids.

Signed at Gladstone, Delta County, Michigan, this 23d day of March, 1927.

WILFRED LAJEUNESSE.